United States Patent [19]

Lind et al.

[11] 4,380,523

[45] Apr. 19, 1983

[54] METHOD OF MANUFACTURING A COMPOSITE MATERIAL

[75] Inventors: David J. Lind, Breadsall; Joyce Richards, Ambergate, both of England

[73] Assignee: Rolls-Royce Limited, London, England

[21] Appl. No.: 283,976

[22] Filed: Jul. 16, 1981

[30] Foreign Application Priority Data

Sep. 10, 1980 [GB] United Kingdom ............... 8029268

[51] Int. Cl.³ ........................... B29D 3/02; B29F 5/00
[52] U.S. Cl. .................................. 264/257; 156/173; 156/174; 156/242; 264/136
[58] Field of Search ............... 264/134, 135, 136, 137, 264/257, 258, 250; 428/902, 911, 375, 367; 156/173, 242, 174

[56] References Cited

U.S. PATENT DOCUMENTS

| | | | |
|---|---|---|---|
| 2,523,022 | 9/1950 | Horstman | 428/375 |
| 3,556,922 | 1/1971 | Green et al. | 428/902 |
| 3,765,998 | 10/1973 | Oswald et al. | 264/136 |
| 3,790,432 | 2/1974 | Fletcher et al. | 264/136 |
| 3,915,781 | 10/1975 | Novak et al. | 428/902 |
| 4,131,625 | 12/1978 | Arnold et al. | 428/902 |

FOREIGN PATENT DOCUMENTS 2156346 5/1972 Fed. Rep. of Germany ...... 428/902
1485586 9/1977 United Kingdom .

Primary Examiner—Willard E. Hoag
Attorney, Agent, or Firm—Cushman, Darby & Cushman

[57] ABSTRACT

A method of manufacturing a composite material which comprises filaments enclosed in a matrix of a high temperature resistant thermoplastic polymer. The method entails impregnating the filament with a first high temperature resistant thermoplastic polymer in an amount sufficient only to lightly bind the fibres together. The bound fibres are then interposed between sheets of a second thermoplastic polymer and the whole structure subjected to heat and pressure for a time sufficient to ensure impregnation of said second thermoplastic polymer into said filaments and diffusion of the first thermoplastic polymer into the second thermoplastic polymer.

6 Claims, No Drawings

METHOD OF MANUFACTURING A COMPOSITE MATERIAL

BACKGROUND OF THE INVENTION

This invention relates to a method of manufacturing composite materials and in particular to a method of manufacturing composite materials comprising reinforcing filaments enclosed in a matrix of a thermoplastic polymer.

It has long been common practice to manufacture composite materials which comprise reinforcing filaments enclosed in a matrix of a thermosetting polymer. Thus one particularly useful composite material comprises reinforcing filaments of carbon enclosed in a matrix of an epoxy resin. Whilst such composite materials have been extremely useful in replacing certain metals as constructional materials in the engineering industry, they do nevertheless suffer from certain disadvantages which makes their manufacture troublesome. For instance, there are storage problems associated with thermosetting polymers prior to their incorporation into a matrix since they tend to have finite shelf lives and sometimes require to be stored in a refrigerated environment. Additionally after a thermosetting polymer has been heated to an appropriate temperature, it hardens permanently, thereby effectively precluding its further shaping by deformation.

Thermoplastic polymers do not have these storage problems since they already have high molecular weights and additionally are thermoformable so that they can be re-worked many times after their initial moulding at temperature. Thus thermoplastic polymers have certain attractions as a replacement for thermosetting polymers as a matrix material in filament reinforced composite materials. However, there are difficulties in producing a composite material which comprises reinforcing filaments enclosed in a matrix of a thermoplastic polymer. One route for the manufacture of such composite materials entails impregnating the reinforcing filaments with a solution of the thermoplastic polymer in a suitable solvent. The solvent is then evaporated off and moulding carried out to provide the resultant composite material. Composite materials manufactured by such a method suffer from several disadvantages. For instance, it is very difficult to completely evaporate off the polymer solvent. Some trapping of the solvent may occur with the result that the composite material is, to a certain extent, porous. This reduces its strength and sometimes leads to the accelerated thermal degradation of the polymer if the composite material is subjected in use to elevated temperatures. Another disadvantage is that it is not usually possible to accurately monitor the actual amount of polymer which is impregnated into the filaments. Some resin usually runs off the filaments with the result that the final polymer content of the composite material is lower than anticipated.

In U.K. Pat. No. 1,485,586 there is described a method of manufacturing a composite material in which filaments are interleaved between films of a thermoplastic polymer and the resultant sandwich structure subjected to heat and pressure so that the polymer flows and impregnates the filaments. This method has the advantage of not requiring the use of a solvent and consequently avoids the pitfalls associated with solvent use. However, if the polymer is of high viscosity at the temperatures usually employed in this type of method, then difficulty is encountered in achieving a satisfactory level of impregnation of the filaments by the polymer. Consequently the resultant composite material has a low filament level per unit volume of composite material, thereby adversely affecting its mechanical properties.

U.K. Pat. No. 1,570,000 describes a somewhat similar method of manufacture of a composite material, differing in that the filaments are impregnated with a solution of a thermoplastic polymer in a suitable solvent and the solvent evaporated off prior to the impregnated filaments being interleaved between films of a second thermoplastic polymer. Then as in the previous method, the resultant sandwich structure is subjected to heat and pressure to cause the thermoplastic polymer films to flow after which the assembly is cooled under pressure to avoid distortion of the resultant composite material. The teachings of U.K. Pat. No. 1,570,000 are directed to impregnation of the filaments with a thermoplastic polymer so that there is a polymer pick-up by the filaments which, after solvent evaporation, amounts to 16 to 40% by weight. Unfortunately this means that whilst the method permits the use of films of high viscosity thermoplastic polymers, the resultant composite material is prone to solvent attack, even if the thermoplastic polymer of the film is of low solvent solubility. Thus the thermoplastic polymer originally applied in solvent solution is prone to solvent attack, thereby leading to increased likelihood of stress-cracking occurring in the composite material. A further disadvantage of this method is that whilst the thermoplastic polymer used for the films may have desirable properties as a matrix material, the incorporation of a relatively large amount of a different thermoplastic polymer in that matrix may have a deleterious effect upon the properties of the resultant composite material.

It is an object of the present invention to provide a method of manufacturing a composite material wherein the aforementioned difficulties in manufacturing filament reinforced, thermoplastic polymer matrix composite materials are substantially avoided.

DETAILED DESCRIPTION OF THE INVENTION

According to the present invention, a method of manufacturing a composite material comprises the steps of applying a first high temperature resistant thermoplastic polymer to a layer or layers of reinforcing filaments in an amount sufficient only to lightly bind said filaments together, forming a structure of the or each layer or layers of the thus bound filaments and sheets of a second high temperature resistant polymer so that the or each layer of bound filaments is interposed between sheets of said second thermoplastic polymer, compressing said structure at a temperature at which said first thermoplastic polymer does not thermally decompose and at which second thermoplastic polymer is mobile, maintaining said compression at said temperature for sufficient time for said second thermoplastic polymer to impregnate said layer or layers of bound filaments and for at least a major portion of said first thermoplastic polymer to diffuse into said second thermoplastic polymer, cooling the thus formed composite material under compression in order to avoid any distortion thereof and subsequently discontinuing said compression.

We have found that in order to lightly bind the filaments together, it is necessary to apply sufficient of the first high temperature resistant thermoplastic polymer to increase the weight of the filaments by up to 5%.

A convenient method of applying the first thermoplastic polymer to the filaments is to dissolve the polymer in a suitable solvent, apply that solution to the fibres and subsequently evaporate off the solvent. There are however other methods of application. Thus for example the filaments could be interposed between two thin sheets of the first thermoplastic polymer and the assembly compressed at or above the glass transition temperature of the polymer so as to directly apply the polymer to the filaments. An alternative method could be to pass the filaments through a heated fluidised bed containing the powdered polymer.

It is desirable to apply the first thermoplastic polymer to the filaments when those filaments are in a given configuration so that when the filaments are formed into a structure with the sheets of the second thermoplastic polymer, that configuration is retained. This being so, we prefer to apply the first thermoplastic polymer by winding the filaments on to a mandrel so that they adopt the desired configuration, spraying a solution of the first thermoplastic polymer on to the wound filaments, evaporating off the solvent and finally removing the filaments from the mandrel. We have found that if this procedure is carried out, the filaments may be easily handled without losing their initial general configuration.

The first thermoplastic polymer may be a polycarbonate, a polysulphone, a polyethersulphone or a polyimide, these being polymers which have high temperature resistance and are capable of lightly binding the filaments together. They are moreover readily soluble in a number of organic solvents which makes it possible to apply them to the filaments by the previously mentioned solvent route.

The second thermoplastic polymer may be an aromatic polyether polymer. The preferred aromatic polyether polymer is an aromatic polyetheretherketone which is marketed by ICI Limited under the name "PEEK". This aromatic polyetheretherketone differs from a large number of other thermoplastic polymers such as polysulphones and polyethersulphones in that it is capable of a high degree of crystallisation. Thus a figure of 48% crystallinity has been reported. This degree of crystallinity imparts to the polymer enhanced mechanical properties and a high degree of resistance to the common solvents. Moreover it has a melting point of 334° C. which makes it suitable for high temperature applications.

The structure of filaments bound by the first thermoplastic polymer and the sheets of the second thermoplastic polymer is compressed at a pressure, for instance 14 MN/m$^2$, which is sufficient to result in the impregnation of the bound filaments by the second thermoplastic polymer. If the first thermoplastic polymer is a polyethersulphone and the second thermoplastic polymer is "PEEK" then this compression may be carried out at a temperature of approximately 400° C. In order for the major portion of the first thermoplastic polymer, to diffuse into the second, the application of heat and pressure is preferably maintained for at least one hour. In fact we have found that adequate diffusion usually occurs if the pressure and heat are maintained for approximately two hours.

The diffusion of the first thermoplastic polymer into the second ensures that in the resultant composite material, a large proportion of the polymer which is in contact with the filaments is in fact the second thermoplastic polymer. This means that if the mechanical properties of the second thermoplastic polymer are superior to those of the first thermoplastic polymer, then direct bonding between the filaments and the second thermoplastic polymer will result in a composite material having mechanical properties superior to those of a composite material in which the majority of the polymer in contact with the filaments is the first thermoplastic polymer. A further advantage of such diffusion is that if the first thermoplastic polymer is readily soluble in organic solvents and the second thermoplastic polymer is not, then the resultant composite material will be less prone to organic solvent attack than composite materials in which diffusion is limited or non-existent.

The filaments may be of any of the types which are commonly used for reinforcement in composite materials. Thus mention may be made of filaments of glass, graphite, steel, silicon carbide, alumina, boron, boron nitride etc. However we prefer to utilise filaments of carbon.

The filaments moreover may be aligned in any desired configuration prior to the application of the first thermoplastic polymer to them Thus although we prefer to align the filaments so that they are unidirectional, other configurations may be utilised. For instance in certain circumstances, it may be desirable to utilise filaments which are in the form of a woven cloth or mat.

Whilst the method of the present invention may be utilised in the manufacture of finished articles, it may also be used in the manufacture of prepregs. Thus prepregs comprise composite material portions which may be subsequently grouped together and subjected to heat and pressure in order to fuse them together and form them into a finished article.

The following examples will serve to illustrate the invention:

EXAMPLE 1

A release layer of a non-porous PTFE/glass cloth known as Tygafluor ("Tygafluor" is a registered trademark) was attached to a flat 270 mm square flat mandrel. Carbon fibre (Toray 3000 90 A) was then wound over the mandrel at 36 turns per 25.4 mm. Polyethersulphone (Grade 100P and manufactured by ICI Limited) was dissolved in methylene chloride and the solution was sprayed on to the wound fibres until a total amount of 0.8 grams of the polyethersulphone had been applied to the fibres adjacent the Tygafluor cloth. After allowing the coated fibres to dry in air at room temperature overnight, it was found that they were lightly bound by the polyethersulphone so that they could be removed from the mandrel and cut into 16 unidirectional pieces measuring 113 mm × 44.5 mm without losing their fibre orientation. The sixteen pieces were then further dried at 125° C. in order to ensure complete removal of the methylene chloride from the polyethersulphone. It was found after drying that the application of the polyethersulphone to the carbon fibres had increased their weight by 4.5%.

Eight of the unidirectional pieces were taken and each one was sandwiched between two 50 μm thick sheets of a high temperature resistant aromatic polyetheretherketone polymer which is marketed by ICI Limited under the name "PEEK". The resultant sandwich structures were then formed into a stack containing eight of the unidirectional pieces of lightly bonded carbon fibre and sixteen sheets of "PEEK". The stack was then compression moulded for two hours at 400° C. and 14 MN/m² pressure and then allowed to cool to room temperature before compression was discontinued.

The resultant composite material was found to contain 67% by volume of carbon fibre and was completely void free. It has a flexural strength of 1.79 GN/m² and a flexural modulus of 138 GN/m² giving a composite breaking strain of 1.30%.

EXAMPLE 2

Example 1 was repeated with the exception that the stack was compression moulded at 400° C. and 14 MN/m² pressure for only ½ hour.

The resultant composite material contained 67% by volume of carbon fibre. It had a flexural strength of 1.62 GN/m² and a flexural modulus of 143 GN/m² giving a breaking strain of 1.13%.

EXAMPLE 3

Example 1 was repeated with the exception that the stack was compression moulded at 400° C. and 13 MN/m² pressure for one hour.

The resultant composite material contained 67% by volume of carbon fibre. It had a flexural strength of 1.63 GN/m² and a flexural modulus of 141 GN/m² giving a breaking strain of 1.16%.

It will be seen therefore from Examples 1 to 3 that the time during which the stack is maintained under compression and temperature has an important bearing on the flexural strength and breaking strain of the resultant composite material. Thus we believe that this is due to the fact that the compression and temperature results in the diffusion of polyethersulphone from the carbon fibres into the polyetheretherketone matrix material. Thus to ensure that a composite material is produced with an adequate degree of diffusion, we prefer that compression of the stack at temperature should be maintained for at least an hour.

EXAMPLE 4

Example 1 was repeated using Courtaulds XAS 3000 filament tow carbon fibre instead of the Toray 3000 90 A.

The resultant composite material contained 68% by volume of the carbon fibre. It had a flexural strength of 2.22 GN/m² and it has a flexural modulus of 147 GN/m² giving a breaking strain of 1.51%.

In order to demonstrate the superior properties of composite materials produced in accordance with the method of the present invention, the properties of samples of composite materials produced by the conventional solvent route were compared with those of the composite material of Example 1. The conventional solvent route entails dissolving the matrix polymer in a suitable solvent, impregnating fibres with the resultant solution, evaporating off the solvent and substantially moulding under temperature and pressure to produce the required shape. Tthe test pieces produced by the conventional route were of the same dimensions as that produced in Example 1.

The results obtains were as follows:

| Composite Material | Moulding Conditions | Fibre Volume % | Flexural Strength GN/m² | Flexural Modulus GN/m² | Breaking Strain % |
|---|---|---|---|---|---|
| Toray 3000 90A Carbon Fibre Polysulphone resin matrix | 14 MN/m² at 320° C. | 71 | 1.36 | 132 | 1.03 |
| Toray 3000 90A Carbon Fibre Polyethersulphone resin matrix | 12 MN/m² at 360° C. | 59 | 1.29 | 122 | 1.06 |
| Example 1 | 14 MN/m² at 400° C. | 67 | 1.79 | 138 | 1.30 |

It will be seen therefore that the flexural strength, flexural modulus and breaking strain of the composite material of Example 1 are superior to those of composite materials produced by the conventional solvent route.

Although the method of the present invention has been described with references to composite materials produced from particular thermoplastic polymers, it will be appreciated that it is not restricted to these polymers and is generally applicable to all high temperature resistant thermoplastic polymers.

We claim:
1. A method of manufacturing a substantially completely void free composite material comprising the steps of
   (a) applying a first high temperature resistant thermoplastic polymer to at least one layer of reinforcing filaments in an amount sufficient to increase the weight of said filaments by up to about 5% and to lightly bind said carbon filaments together and to retain the configuration of said filaments,
   (b) forming a structure of said at least one layer of the thus bound filaments and sheets of a second high temperature resistant polymer so that one layer of said bound filaments is interposed between sheets of said second thermoplastic polymer and to retain the configuration of said filaments,
   wherein the first thermoplastic polymer is a polycarbonate, a polysulphone, a polyethersulphone or a polyimide and the second thermoplastic polymer is an aromatic polyetherether ketone,
   (c) compressing said structure at a temperature at which said first thermoplastic polymer does not thermally decompose and at which said second thermoplastic polymer is sufficiently mobile to impregnate said layer of reinforcing filaments, said temperature being insufficient to soften said filaments,
   (d) maintaining said compression at said temperature for at least one hour to cause said second thermoplastic polymer to impregnate said at least one layer of bound filaments and for at least a major portion of said first thermoplastic polymer to diffuse into said second thermoplastic polymer,

(e) cooling the thus formed composite under compression in order to avoid any distortion thereof, and subsequently (f) discontinuing said compression thereby producing a composite material that is substantially completely void free.

2. A method of manufacturing a composite material as claimed in claim 1 wherein said first thermoplastic polymer is dissolved in a solvent prior to its application to said filaments and said solvent is subsequently evaporated off after said application to said filaments.

3. A method of manufacturing a composite material as claimed in claim 1 wherein said filaments are of carbon.

4. The method according to claim 1 in which the resulting composite material has a flexural strength of at least 1.62 $GN/m^2$ and a flexural modulus of at least 138 $GN/m^2$.

5. A method of manufacturing a composite material as claimed in claim 1 wherein said filaments are arranged in predetermined configuration prior to the application thereto of said first thermoplastic polymer so that said configuration of said filaments is maintained by said first thermoplastic polymer.

6. A method of manufacturing a composite material as claimed in claim 5 wherein said filaments are arranged in said configuration by winding them on to a mandrel and are subsequently removed from said mandrel prior to them being interposed between said sheets of said second thermoplastic polymer.

* * * * *